Aug. 10, 1971 T. JEPPSSON ET AL 3,598,681
APPARATUS FOR PROVIDING CARTON BLANKS WITH
A COATING OF PLASTIC MATERIAL
Original Filed March 20, 1967
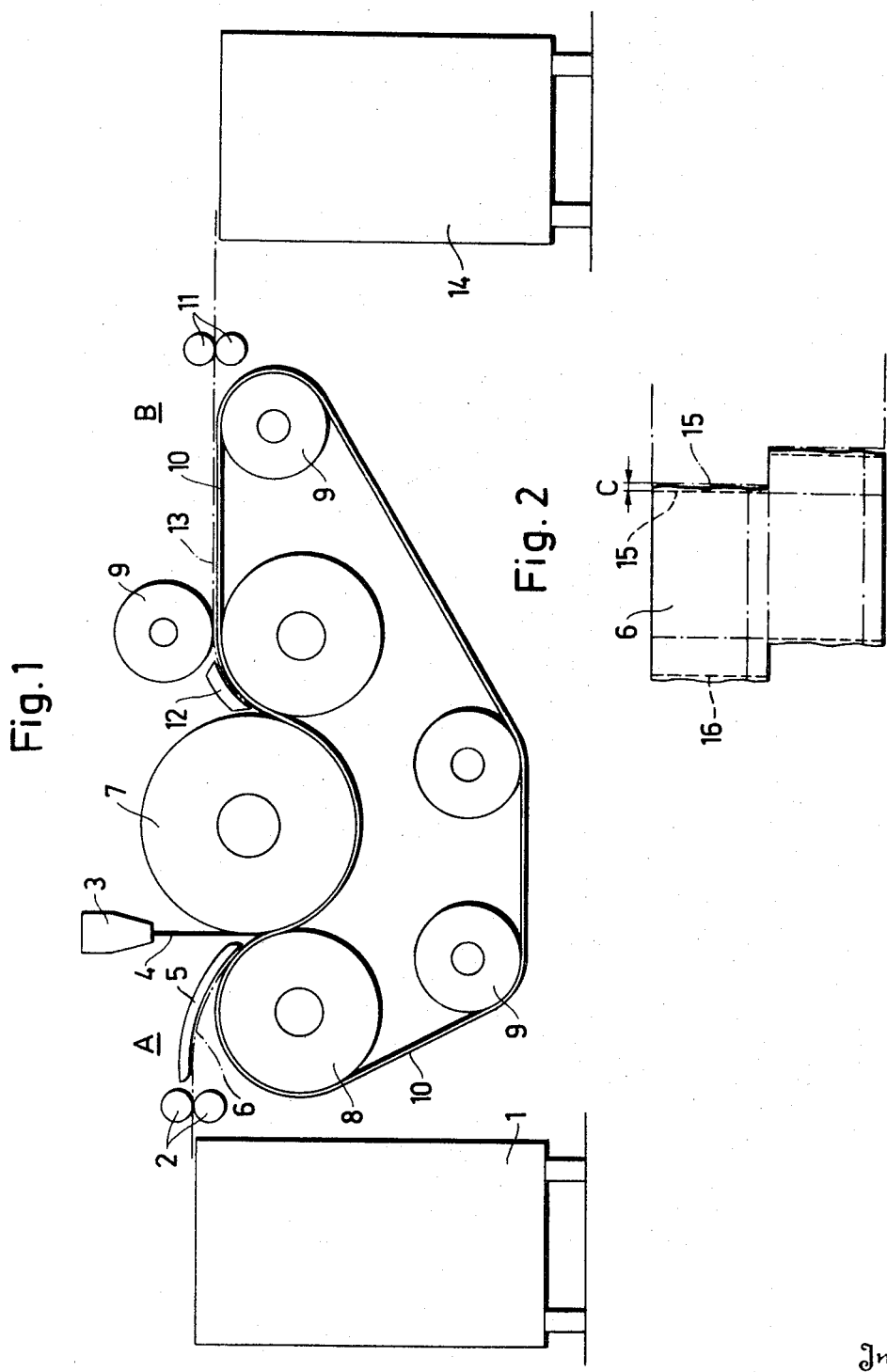
Inventors
Torsten Jeppsson
Kjell Ingvar Holmström
Rolf Magnus Dilot
By Pierce, Schiffler & Parker
Attorneys

United States Patent Office

3,598,681
Patented Aug. 10, 1971

3,598,681
APPARATUS FOR PROVIDING CARTON BLANKS WITH A COATING OF PLASTIC MATERIAL
Torsten Jeppsson, Kjell Ingvar Holmström, and Rolf Magnus Dilot, Lund, Sweden, assignors to AB Akerlund & Rausing, Lund, Sweden
Original application Mar. 20, 1967, Ser. No. 624,561, now Patent No. 3,518,144, dated June 30, 1970. Divided and this application Jan. 15, 1970, Ser. No. 3,053
Claims priority, application Sweden, Mar. 25, 1966, 3,957/66
Int. Cl. B32b 31/18
U.S. Cl. 156—501
2 Claims

ABSTRACT OF THE DISCLOSURE

Apparatus for providing carton blanks with a coating of a transparent plastic material and wherein printed matter on a surface of the carton blanks is viewable beneath the plastic coating. The blanks are fed longitudinally in succession and with a slight gap between the edges of successive blanks to a station where the transparent plastic material is extruded as a web and applied in web form by a press roll to the printed surface of the line of blanks, the plastic web bridging the gaps between successive blanks. The continuous composite material which now consists of the web of plastic material united to the line of carton blanks is cooled by a cooling roll and then passed between stretch rolls running at a surface speed in excess of the linear speed of the composite material which serve to accelerate the composite material and hence effect stretching and breaking of the plastic web in the gaps between successive blanks, thus separating the plastic coated blanks from each other.

---

The present invention relates to an improved apparatus for coating carton blanks with a plastic material and is a division of our co-pending application Ser. No. 624,561 filed Mar. 20, 1967, now Pat. No. 3,518,144.

Cartons which are printed with advertising, decorative and/or information texts and which are to be provided with a protective coating over the texts have, in accordance with conventional methods have generally first provided with the plastic coating by extruding the coating film, which thus obtains the shape of a web similarly to the carton material, and by uniting a web of the carton material with the said film, which is still liquid and sticky when being united with the web, so that the said film adheres to the carton material without further measures. The united plastic film and carton material are then provided on the film side, thus on the exterior of the film, with the necessary advertising, decorative and/or informative texts. After being punched and erected the blanks are ready to receive the contents to be filled into them. Even if inks suitable for this purpose are used for the said texts it is not possible to prevent the inks from smearing since they will dry unevenly and incompletely on the absorption-free film, and even if the ink has dried completely it will remain as a rather loose layer on the exterior of the carton and the exterior of the film and is therefore easily damaged before the carton with its contents reaches the final buyer. In order to eliminate these drawbacks at least to some extent, the first fresh print is generally treated with suitable powders, but this has not entailed the effect aimed at and has besides soiled the products to some extent during the manufacturing process.

For the same purpose carton blanks are sometimes provided with advertising, decorative and/or informative texts which are glued manually one at a time on a continuously set plastic film by means of adhesives. This method is consequently manual to a very high degree and differs basically from the former process and is regarded by experts as a laminating process similar to e.g. the manufacture of laminated wood. From an economical viewpoint it is not acceptable in modern industrial production even if the print is protected by the transparent coating film.

Experts are still of the opinion that the process of providing cartons with a plastic coating film must be carried out in the manner described above, and they will accept the drawbacks connected with this process. This adherence to a known method is probably due to the fact that the extrusion of a thin film is a relatively difficult process and calls for a continuously undisturbed and carefully supervised manufacturing process without interruptions. By using a continuously fed web there are good posibilities of being able to work without disturbing interruptions, and to some extent this may explain why the experts stubbornly refuse to change this method. It has, however, proved unexpectedly possible to eliminate the drawbacks connected with methods used until now for providing carton blanks with a plastic coating film, by utilizing the concept of the present invention.

In accordance with the present invention, the carton blanks are fed longitudinally in succession and with a slight gap between the edges of successive blanks to an extruding station where transparent plastic material is extruded as a web and applied, in web form by a press roll to the printed surface of the line of blanks, the plastic web bridging the gaps between successive blanks. The continuous composite material, which now consists of the web of plastic material united to the line of carton blanks, is cooled by a cooling roll and then passed between stretch rolls running at a surface speed in excess of the linear speed of the composite material which serve to accelerate the composite material and hence effect stretching and breaking of the plastic web in the gaps between successive blanks, thus separating the plastic coated blanks from each other.

A preferred embodiment of the invention will be described in conjunction with the attached drawings wherein:

FIG. 1 is a diagrammatic view of the apparatus according to the invention for coating the printed blanks.

FIG. 2 shows a carton blank which has been treated by the apparatus.

In the drawing, a holder for untreated carton blanks is designated 1, and a device for separate dispensing of the carton blanks in the holder is shown merely by means of a pair of rollers 2, since dispensing devices of this kind may be embodied in any known manner and consequently do not have to be described in detail. Reference numeral 3 designates an extrusion device for extruding a thin transparent plastic film 4. The device also has guiding means 5 for guiding the carton blanks 6 fed by the rollers 2 in a manner to be described below. The device has a pair of cooling and pressing rollers 7 and 8, respectively, the roller 7 being preferably a cooling roller and roller 8 being preferably a pressing roller, which are adapted by means of a preferably adjustable pressure to be in contact with a conveying web 10 guided between and over the cooling and pressing rollers 7 and 8 and a number of guiding rollers 9, said web being intended for the extruded film 4 and the carton blanks 6. A pair of acceleration rollers 11 are disposed adjacent the exit end B of the conveying web 10, which is opposite to the entry end A of the conveying web adjacent the guiding means 5 and the extrusion device 3. Between the roller 7 and the adjacent guiding rollers 9 there are provided guiding means 12 between which means and the conveying web 10 the material web 13 consisting of the film 4 and the carton blanks 6 is advanced. The feeding device 2 with the guiding means 5 for the carton blanks thus opens above the entry end A of the conveying web 10 immediately adjacent the area where the cooling and the pressing rollers 7 and 8 rest against the conveying web 12 inserted between them and where the film web 4 is introduced between the cooling roller 7 and the conveying web 12. The device has a holder 14 for collecting finished carton blanks. The device may have a suitable frame with journals for the various rollers and transmissions for rotating the rollers, all of which are of a known kind and do not therefore have to be described in detail here.

The carton blanks 6 which are to be provided with the plastic coating film 4 have advertising, decorative and/or informative texts printed on that side which faces the film. The blanks are provided in advance with the said print and are thereafter punched and collected and deposited in the holder 1. The carton blanks 6 are withdrawn one at a time from the holder 1 and are advanced by means of the rollers 2 one after another in such a sequence that that surface of the blanks which is provided with the advertising, decorative and/or informative print faces the largely liquid and consequently sticky film 4 which is extruded by means of the extrusion device 3 as an endless web advanced in time with the carton blanks 6. Of course, it is possible to operate the apparatus in a known manner so that the film 4 is subjected to tensile stress immediately after leaving the extrusion device 3, whereby it is thinned out before being inserted between the rollers 7 and 8. The line of carton blanks is moved continuously in contact with and pressed against the film 4 in such a way that the adjacent margins 15 of successive carton blanks (see FIG. 2) are spaced a distance C from each other for a purpose to be described below. The composite material web 13 formed from the film 4 and the carton blanks united therewith is cooled while being continuously fed at the original speed of the carton blanks 6 and the film 4 down below the roller 7 in between the guiding means 12 and the roller 9 up to the exit end B of the device. At a point where the film 4 has set after the cooling of the composite material 13 and become united with the carton blanks 6, the film 4 bridging the interspace C as a solidified separate section between successive carton blanks 6 in the composite material web 13, the speed of the composite web 13 is increased by means of the acceleration rollers 11. This speed increase may amount to about 5%. Through the increased speed the material web 13 is exposed to tensile stress so that the film sections between the carton blanks 6 are stretched and break, and the separate carton blanks 6 with the sections of the film 4 united therewith may be collected in the holder 14 ready to be erected and filled with their contents. The cooling and the pressing rollers 7 and 8 press and cool the material web 13 formed from the carton blanks 6 and the film 4 after the latter has been united with the carton blanks 6 introduced like the film between the rollers 7, 8 and the conveying web 10. The film 4 and the carton blanks 6 are consequently well pressed together so that the union between them may resist the tensile stresses exerted on the material web 13 by means of the acceleration rollers 11, thus entailing that only the non-attached film sections between the successive separate carton blanks 6 are stretched and break. The film sections which have been united with their respective carton blanks are not affected by the tensile stress exerted on the material web but will remain united with the carton blanks.

If several carton blanks disposed beside each other are fed onto the conveying web 10 and united with the undivided film 4, cuts may easily be made between the various carton blanks in the direction of the motion of the conveying web 10 and thus in the direction of the motion of the film 4 and the carton blanks 6 through the device. Such cuts may also be made to a certain extent transversally of the movement of the conveying web 10 but require careful supervision and adjustment and will therefore disturb the operation of the device to a certain extent.

As appears from the carton blank 6 shown in FIG. 2 and treated according to the invention, the said blank 6 has film portions 16 projecting freely on account of the breaking of the film 4, which do not, however, make it difficult or impossible to erect a carton of the blank 6 but have in many cases a positive effect by contributing to improved sealing of the carton. These film portions 16 are, however, mostly of such small dimensions that they may be neglected completely.

Modifications are possible within the scope of the inventive idea as defined in the appended claims.

We claim:

1. Apparatus for providing transparent plastic coated carton blanks having printed matter on the surface of the blanks beneath the plastic coating which comprises a feeding station establishing a line of pre-printed separate carton blanks and with a slight gap between the trailing and leading edges of successive blanks in the line, a coating station, means at said coating station for extruding a continuous web of hot transparent thermoplastic material having a width at least equal to the width of the carton blanks so that the entire surface area of the blanks will be coated, a first pair of rolls into the nip between which said extruded thermoplastic web and line of blanks are fed, one of said rolls being a cooling roll and serving to cool and set said web of thermoplastic material and unite the same to said line of blanks as the composite material passes in contact with the periphery of the cooling roll, and a pair of stretch rolls between which the full width of said composite material is passed after leaving said cooling roll, said stretch rolls rotating on an axis parallel to that of said first pair of rolls and having a peripheral speed exceeding the linear speed of said composite material thereby stressing said thermoplastic web in the longitudinal direction throughout the entire width thereof in the gaps between successive blanks and producing a longitudinal stretch until the rupture point is reached thus breaking the web and separating the plastic coated blanks.

2. Apparatus as defined in claim 1 and which includes an endless conveying web carrying said line of blanks and extruded web of thermoplastic material into the nip between said first pair of rolls and in contact with a portion of the periphery of said cooling roll, said conveying web also serving to feed the composite material to said stretch rolls and having a linear speed less than the peripheral speed of said stretch rolls.

References Cited

UNITED STATES PATENTS

| | | | |
|---|---|---|---|
| 2,171,259 | 8/1939 | Scott | 156—269 |
| 2,237,429 | 4/1941 | Harrington | 118—239X |
| 2,607,712 | 8/1952 | Sturken | 156—501 |
| 2,944,586 | 7/1960 | Yanulis | 156—501X |
| 3,384,523 | 5/1968 | Bender | 156—522X |

JOHN P. McINTOSH, Primary Examiner

U.S. Cl. X.R.

156—522